United States Patent
Zhu et al.

(10) Patent No.: US 7,836,167 B2
(45) Date of Patent: Nov. 16, 2010

(54) METHOD FOR MONITORING CONNECTION STATE OF USER

(75) Inventors: Haitao Zhu, Guangdong (CN); Changcheng Yan, Guangdong (CN); Dakun Qiu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1334 days.

(21) Appl. No.: 11/337,761

(22) Filed: Jan. 23, 2006

(65) Prior Publication Data
US 2007/0282998 A1     Dec. 6, 2007

Related U.S. Application Data

(63) Continuation-in-part of application No. PCT/CN2004/000850, filed on Jul. 22, 2004.

(30) Foreign Application Priority Data

Jul. 23, 2003    (CN)    ................................ 03 1 32983

(51) Int. Cl.
*G06F 15/173*    (2006.01)
(52) U.S. Cl. ................ 709/224; 709/225; 709/226; 709/237; 340/825; 370/252
(58) Field of Classification Search ................ 709/217, 709/224, 227, 225, 223, 229, 219, 203, 221, 709/206; 701/117; 370/252, 392, 468, 352, 370/355; 702/178; 463/40, 41, 42
See application file for complete search history.

(56) References Cited

U.S. PATENT DOCUMENTS 6,050,898 A * 4/2000 Vange et al. ................ 463/42
6,636,894 B1 * 10/2003 Short et al. ................ 709/225
6,701,522 B1 * 3/2004 Rubin et al. ................ 717/178
6,735,624 B1 * 5/2004 Rubin et al. ................ 709/219
6,789,110 B1 * 9/2004 Short et al. ................ 709/221

(Continued)

FOREIGN PATENT DOCUMENTS

CN        1416072 A        5/2003

(Continued)

OTHER PUBLICATIONS

Dodani et al. Architecting Portal Solutions. IBM Redbooks. 2003.*

(Continued)

*Primary Examiner*—Wing F Chan
*Assistant Examiner*—Michael Martinez
(74) *Attorney, Agent, or Firm*—Slater & Matsil, L.L.P.

(57) ABSTRACT

The present invention is directed to a method for monitoring the connection state of users. In the method, when a user accesses a network, the network loads a recognizable browser page on the user terminal and monitors the connection state of the user through message interaction with the browser page. With this method, it can be possible to reliably monitor the online state of the user, so that the authentication and accounting server can accurately charge the user who accesses the network and accepts the services of the network. The handshake mechanism can also be carried out with few or no limitations on the user terminal, thus guaranteeing monitoring of the connection state of users.

15 Claims, 3 Drawing Sheets

U.S. PATENT DOCUMENTS

| | | | | |
|---|---|---|---|---|
| 7,127,511 | B2 * | 10/2006 | Tonouchi | 709/225 |
| 7,327,693 | B1 * | 2/2008 | Rivers et al. | 370/252 |
| 7,437,457 | B1 * | 10/2008 | Eisendrath et al. | 709/225 |
| 7,720,938 | B2 * | 5/2010 | Bowser et al. | 709/219 |
| 2001/0019559 | A1 * | 9/2001 | Handler et al. | 370/468 |
| 2001/0041566 | A1 * | 11/2001 | Xanthos et al. | 455/423 |
| 2002/0091770 | A1 * | 7/2002 | Takakura et al. | 709/205 |
| 2002/0095387 | A1 | 7/2002 | Sosa | |
| 2002/0156812 | A1 * | 10/2002 | Krasnoiarov et al. | 707/513 |
| 2002/0161833 | A1 * | 10/2002 | Niven et al. | 709/203 |
| 2003/0037124 | A1 * | 2/2003 | Yamaura et al. | 709/219 |
| 2003/0065787 | A1 * | 4/2003 | Osafune et al. | 709/227 |
| 2003/0200321 | A1 * | 10/2003 | Chen et al. | 709/229 |
| 2004/0030744 | A1 * | 2/2004 | Rubin et al. | 709/203 |
| 2004/0034502 | A1 * | 2/2004 | Jung | 702/178 |
| 2004/0205473 | A1 * | 10/2004 | Fisher et al. | 715/500 |
| 2005/0034152 | A1 * | 2/2005 | Matsumoto et al. | 725/32 |
| 2005/0043020 | A1 * | 2/2005 | Lipsanen et al. | 455/422.1 |
| 2005/0105509 | A1 * | 5/2005 | Crocker et al. | 370/352 |
| 2005/0157722 | A1 * | 7/2005 | Yoshimoto et al. | 370/392 |
| 2005/0198501 | A1 * | 9/2005 | Andreev et al. | 713/168 |
| 2006/0031476 | A1 * | 2/2006 | Mathes et al. | 709/224 |
| 2006/0136592 | A1 * | 6/2006 | Heymann | 709/227 |
| 2006/0155994 | A1 * | 7/2006 | Sun | 713/169 |
| 2006/0202037 | A1 * | 9/2006 | Gunawardena et al. | 235/462.15 |
| 2006/0234735 | A1 * | 10/2006 | Digate et al. | 455/466 |
| 2006/0291455 | A1 * | 12/2006 | Katz et al. | 370/355 |
| 2007/0159971 | A1 * | 7/2007 | Zhang et al. | 370/230 |
| 2008/0103685 | A1 * | 5/2008 | Morita | 701/117 |

FOREIGN PATENT DOCUMENTS

CN      1416090 A      5/2003

OTHER PUBLICATIONS

Rigney et al. "RFC 2865—Remote Authentication Dial In User Service (RADIUS)." The Internet Society (2000).*

Portal Authentication Technology White Paper. Tech. H3C Technologies, 2008.*

English Abstract of CN1416090A published May 7, 2003 [http://v3.espacenet.com/textdoc?DB=EPODOC&IDX=CN1416090&F=0].

English Abstract of CN1416072A published May 7, 2003 [http://v3.espacenet.com/textdoc?DB=EPODOC&IDX=CN1416072&F=0].

International Search Report for International Application No. PCT/CN2004/000850 mailed Apr. 11, 2004.

* cited by examiner

METHOD FOR MONITORING CONNECTION STATE OF USER

CROSS-REFERENCE TO RELATED APPLICATIONS

This application is a continuation-in-part of PCT Application No. PCT/CN2004/000850, filed Jul. 22, 2004, pending, which designates the U.S., which is hereby incorporated herein by reference in its entirety, and which claims priority from Chinese Application No. 03132983.7, filed Jul. 23, 2003.

FIELD OF THE INVENTION

The present invention relates to network communication technology, and more particularly, to a method for monitoring the connection state of a user based on a handshaking mechanism of Portal authentication.

BACKGROUND OF THE INVENTION

With the development of network communication technologies, various access authentication methods have been adopted for communication networks. Portal authentication is becoming increasingly popular for network operators because of its power supporting capability for new services, elimination of the need for client software, and the like. During implementation of a Portal authentication, to charge a user accurately for its access to the network, it is necessary to monitor the online state of the user in real time. More specifically, when a user logs in successfully, the client terminal sends handshaking packets to the Portal Server periodically. If the Portal Server does not receive the handshaking packets after a given period of time, the Portal Server will force the user to log off to prevent the accounting server from charging the user when the user cannot communicate with the Portal Server.

Currently, the handshaking mechanism referenced above can be implemented as follows. When a user logs in successfully, an application or a control unit is downloaded for the user. The downloaded application periodically creates a TCP/IP connection with the Portal Server, sends handshaking request packets to the Portal Server, and then waits for the response packets from the Portal Server. After receiving a handshaking request packet from the user, the Portal Server updates the on-line time of the user and sends a response packet to the user terminal. After receiving a response packet from the Portal server side, the application or control unit on the user terminal side carries out the proper operations based on the returned connection state of the user. If the Portal Server has not received the user's handshaking request packet after a given period of time, the user will be deemed as being off-line and the Portal Server will send a stop charging packet to the device side.

Such a handshaking mechanism requires installation of an application on the user terminal to ensure the accuracy of charges for a user's access to the network. With ongoing developments in computer technology, software packages for use with a computer are also constantly updated. Therefore, implementation methods such as those described above based on the handshaking mechanism of the Portal authentication can have limitations in application. For example, when the browser on the user terminal is set to a higher security level, the software for sending handshaking request packets often cannot be downloaded. Even if the software is downloaded, the downloaded software often cannot run because of a different operating environment such as different operating systems of the users. In such cases, the handshaking mechanism based on Portal authentication cannot be implemented. The user's online state cannot be monitored and the user who accesses the network can not be charged accurately, which is unacceptable not only to the users but also to the network operators.

SUMMARY OF THE INVENTION

The present invention can provide a method for monitoring the connection state of users so that a server can accurately monitor the online state of a user without an application downloaded on the user terminal. The invention can thereby provide a method for accurately charging a user for accessing the network.

The method according to the present invention can include the following steps. When a user accesses a network, the network side loads a recognizable browser page on the user terminal and monitors the connection state of the user through message interaction with the browser page.

By using this method, the implementation of the handshaking mechanism based on Portal authentication does not require the user terminal to download and install any application, thus overcoming the limitations in the prior art. Thus, monitoring a user's connection state is no longer restricted by different operating systems or different security levels of browsers on the user terminal, and further, Portal authentication does not require client software at the client side. In addition to this advantage, by using this method, the on-line state of a user can be reliably monitored, which facilitates accurate charging by the authentication and accounting server of an user for accessing the network based on the online state of the user.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following description is directed to an exemplary embodiment of the present invention which is implemented in a network based on Portal authentication.

Figure 1:
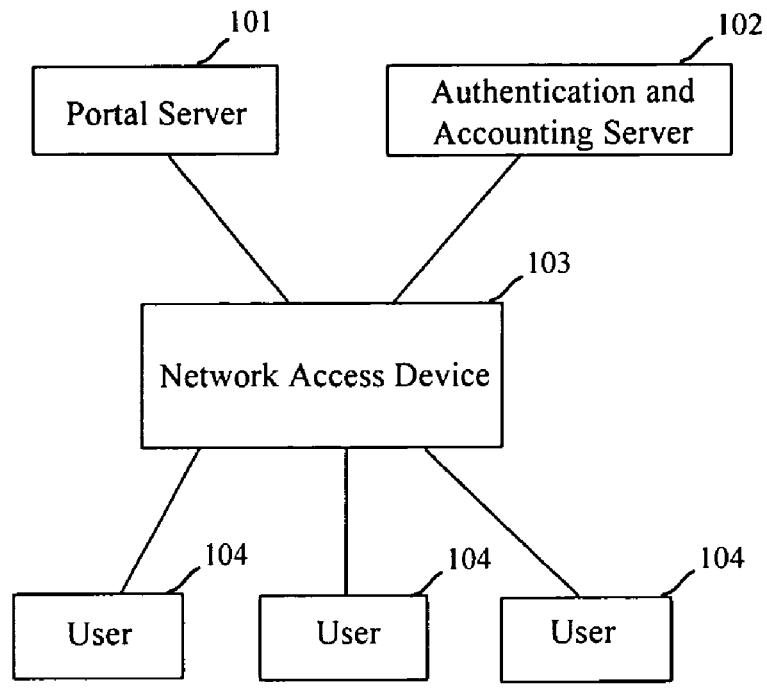
FIG. 1 is a schematic diagram illustrating the networking architecture for Portal authentication.

Referring to FIG. 1, a network architecture for Portal authentication can include a Portal Server 101, an authentication and accounting server 102, a network access device 103 and users 104. Through the network access device 103, the users 104 access the network and accept services provided by the network under the monitoring of the authentication and accounting server 102 and Portal Server 101.

Figure 2:
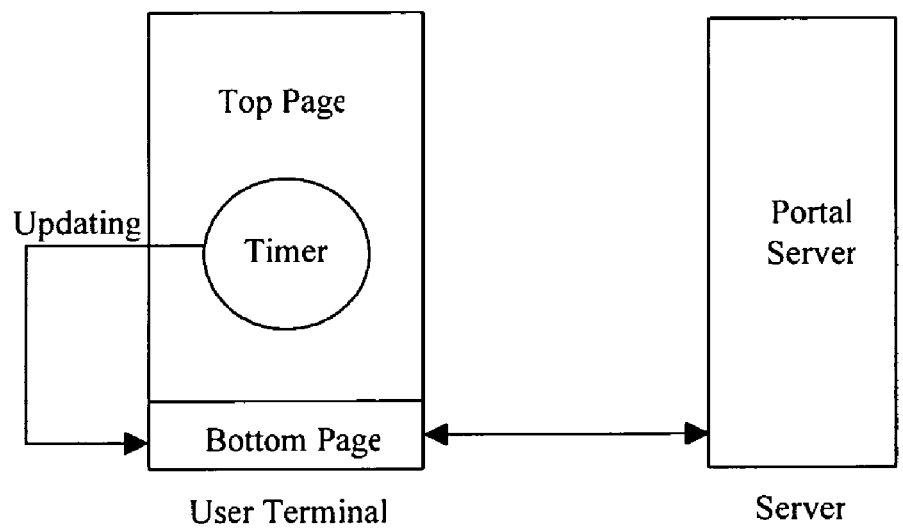
FIG. 2 is a schematic diagram of an embodiment of the present invention.
Figure 3:
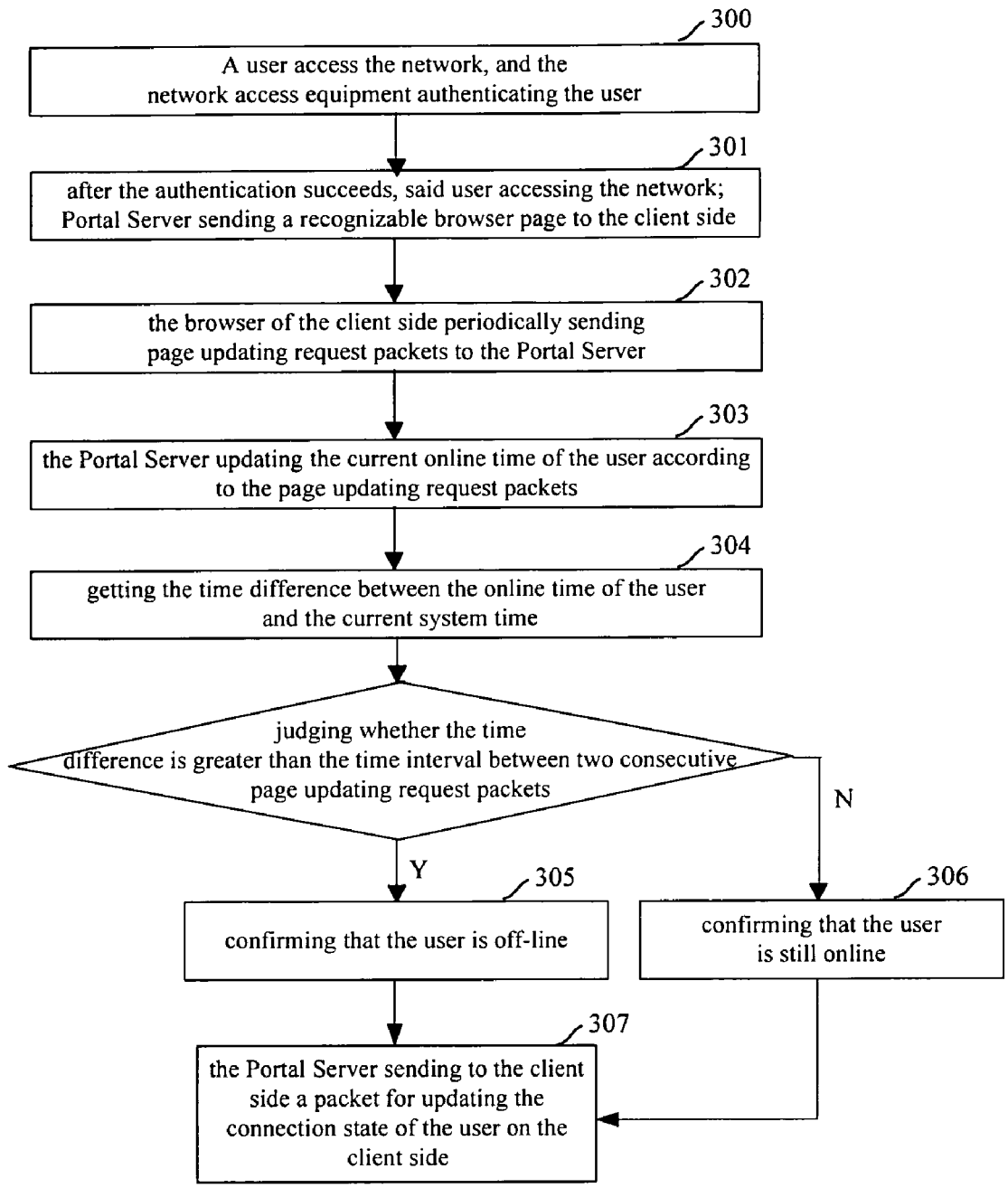
FIG. 3 is a flowchart of an embodiment of the present invention.

Based on the network architecture mentioned above, an embodiment of the invention is shown in FIGS. 2 and 3. This embodiment of the present invention is implemented based on the page updating technique, which can include the following steps:

Step 300: after receiving an access request sent by the user, the network access device authenticates the user via the authentication and accounting server. If the authentication is successful, the network access device permits the user to access the network, sends a browser page request including current state information of the user 104 to the Portal Server, and then proceeds to Step 301. If the authentication fails, the process does not proceed.

Step 301: the Portal Server sends a recognizable browser page to the user. The browser page can be a HTML file based on HTTP, although page files of other formats that can be recognized by the user terminal also can be used in accordance with the present invention.

To provide a better display effect for the user, the browser page displayed according to the browser page file can be configured as two sub-pages, wherein:

One sub-page is called a top page, which fills up the whole screen and is used to dynamically display the information about the online time of the user, the connection state of the user, and the like, based on the information of the user connection state. This sub-page can also include a timer set based on the time interval between two consecutive request packets for page updating.

The other sub-page is called a bottom page, is of zero height and is hidden, and can contain a variable of user connection state reflecting the user state and set by the Portal Server based on the current connection state of the user. The current connection state of the user can include one of the following states: a normal connection state, a time out state of sending page updating request, a forced off-line state by the network access device, and a state of closing the browser page. When the timer set on the top page overtimes, the user sends to the Portal Server a page updating request packet for reloading the bottom page to update the user connection state information in the bottom page.

Step 302: the browser page on the user terminal periodically sends page updating request packets to the Portal Server to update the user connection state information on the browser page and to request the Portal Server to update the online time of the user.

Updating the user connection state information on the user terminal can let the user know more about its online state, including whether a forced off-line is imposed, whether the connection is normal, and the like.

Step 303: after receiving the page updating request packet from the user, the Portal Server updates the online time of the user and then proceeds to Step 304.

Here, the Portal sever periodically polls page updating request packets sent by the user based on a set time interval. The set time interval is usually set to less than the time-out interval set in the timer on the browser page sent to the user terminal. When the Portal server receives the page updating request packet sent by the user, the Portal server updates the current online time of the user based on the connection information of the user stored therein.

Step 304: the Portal Server monitors the time difference between the online time of the user and the current system time. That is, the Portal Server monitors in real time, determines the time difference between the online time of the user and the current system time, judges whether the time difference is greater than the time interval between two consecutive page updating request packets sent by the user terminal, and if so, proceeds to Step 305. Otherwise, the method proceeds to Step 306.

Step 305: confirms that the user is off-line, i.e., the user is disconnected with the network, and then proceeds to Step 307.

Here, if the user is confirmed to be off-line, the Portal Server informs the authentication and accounting server to stop charging the user so as to ensure the accuracy of the charging.

Step 306: confirms that the user is still online, and then proceeds to Step 307.

Step 307: the Portal Server, based on the page updating request packet sent by the user, sends to the user terminal a packet being used to update the user connection state information. Specifically, the Portal Server loads the user connection state information on the bottom page before sending it to the user so as to update the user connection state information, and the user terminal displays part of or all the user connection state information on the top page through the top page based on the updated user connection state information so that the user can receive more information about network access, such as the online time of the user, whether the user was forced off-line, whether the connection was normal, and the like.

Figure 4:
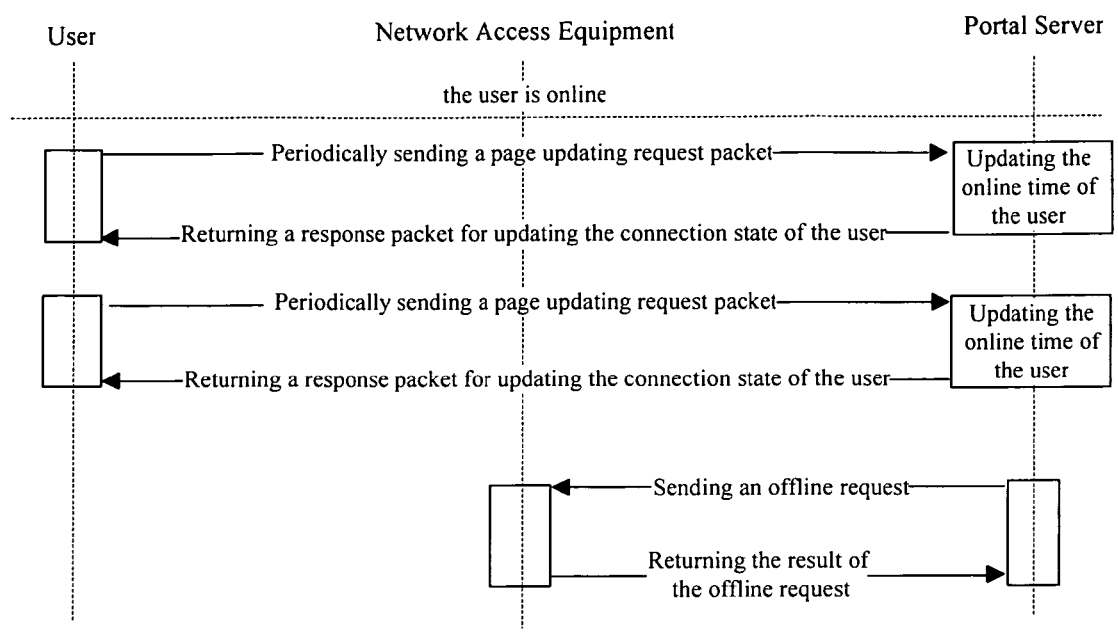
FIG. 4 is a schematic view illustrating a packet interaction procedure between the Portal Server and the user terminal in accordance with the present invention.

The method for monitoring the connection state of a user according to the present invention can be further described with reference to FIG. 4. As shown in FIG. 4, the user sends page updating request packets to the Portal Server periodically through the browser page. The Portal Server updates the online time of the user based on the page updating request packet and returns the user connection state information to the user. During the period when the user is online, this procedure is performed periodically until the Portal Server confirms that the user is off-line, and at this moment, the Portal Server sends to the network access device an off-line request packet relating to the user. After the off-line treatment to the user is implemented by the network access device, the network access device returns a result to the Portal Server.

It can be seen from the above description that if the user closes the browser page loaded by the Portal Server directly in an abnormal manner, the Portal Server can not receive any off-line request packets from the user. In this case, the Portal Server confirms that the user is already off-line according to Steps 304 and 305 mentioned above, and imposes forced off-line on the user through the network access device. At the same time, the Portal Server informs the authentication and accounting server to stop charging the user so as to ensure the accuracy of the charging and prevent unnecessary losses to the user.

In order to keep a normal interaction between the user and the Portal Server, when the user forces a closed operation to the browser page, the Portal Server will prompt the user whether or not to log off. If the user clicks the off-line button or directly closes the prompt window, an off-line request is submitted to the Portal Server by the browser page for an off-line treatment. Otherwise, the user returns to the previous browser page.

In summary, when a user accesses a network, a recognizable browser page is sent to the user terminal, and packet interaction is carried out with this browser page in such a way that the connection state of the user can be monitored. By using this method, it can be possible to reliably monitor the user's online state so the authentication and accounting server can accurately charge a user who accesses the network and accepts the services of the network. Yet, the handshaking mechanism can also be implemented with few or no limitations on the user terminal to implement the monitoring of the user connection state, i.e., whether the user is online.

Mentioned above is only an exemplary embodiment of the present invention, which should not be taken as limitations to the protective scope of the present invention. The foregoing description is an exemplary embodiment of this invention and should not be construed as limiting the protection scope of this invention. Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A method for monitoring a connection state of a user terminal, the method comprising:
    sending a browser page to the user terminal, the browser page being sent by a Portal Server when the user terminal accesses a network, wherein the browser page comprises a timer and user connection state information;
    at the Portal Server, receiving a page updating request packet from the user terminal every time the browser page on the user terminal determines that the timer set therein has timed out;
    updating an online time of the user terminal after receiving the page updating request packet, wherein the Portal Server performs the updating; and
    determining a time difference between the online time of said user terminal and a current system time of the Portal Server;
    calculating a time interval between two consecutive page updating request packets sent by said user terminal;
    assigning said user terminal to a disconnected state if said time difference is greater than the calculated time interval;
    assigning said user terminal to a connected state if said time difference is not greater than the calculated time interval; and
    sending the user connection state information from the Portal Server to the user terminal, wherein the user terminal can update the user connection state information based on the sent information.

2. The method for monitoring the connection state of a user terminal according to claim 1, wherein said user terminal accesses the network based on Portal authentication.

3. The method for monitoring the connection state of a user terminal according to claim 1, wherein said browser page is an HTML file.

4. The method for monitoring the connection state of a user terminal according to claim 1, wherein said user connection state information comprises at least one state selected from the group consisting of a user online state, a time out state of sending a page updating request, a forced off-line state by a network access device, and a state of closing the browser page.

5. The method for monitoring the connection state of a user terminal according to claim 1, wherein said browser page comprises two sub-pages, wherein at least one of said sub-pages comprises said timer and is used to display the user connection state information, and wherein the other of said sub-pages comprises a variable of said user connection state information and requests updating of said variable of the user connection state information when said timer times out.

6. The method for monitoring the connection state of a user terminal according to claim 1, wherein after assigning said user terminal to a disconnected state, the method further comprises imposing a forced off-line treatment on said user terminal and informing the user terminal of the forced off-line treatment.

7. The method for monitoring the connection state of a user terminal according to claim 1, wherein when said user terminal closes said browser page, said browser page submits a user off-line request packet to the Portal Server and performs an off-line treatment.

8. A method for monitoring a connection state of a user terminal, the method comprising:
    sending a browser page to the user terminal when the user terminal accesses a network, wherein the browser page comprises a timer and a user connection state information;
    receiving a page updating request packet every time the browser page on the user terminal determines that the timer set therein has timed out;
    after receiving the page updating request packet, updating an online time of the user terminal;
    determining a time difference between the online time of the user terminal and a current system time;
    calculating a time interval between two consecutive page updating request packets sent by said user terminal;
    assigning said user to a disconnected state if said time difference is greater than the calculated time interval;
    assigning said user to a connected state if said time difference is not greater than the calculated time interval; and
    sending the user connection state information from the Portal Server to the user terminal, wherein the user terminal can update the user connection state information based on the sent information.

9. The method for monitoring the connection state of a user terminal according to claim 8, wherein said user connection state information comprises at least one state selected from the group consisting of a user online state, a time out state of sending a page updating request, a forced off-line state by a network access device, and a state of closing the browser page.

10. The method for monitoring the connection state of a user terminal according to claim 8, wherein said browser page comprises two sub-pages, wherein at least one of said sub-pages comprises said timer and is used to display the user connection state information, and wherein the other of said sub-pages comprises a variable of said user connection state information and requests updating of said variable of the user connection state information when said timer times out.

11. The method for monitoring the connection state of a user terminal according to claim 8, wherein the method further comprises sending the user disconnection state information to the user terminal.

12. The method for monitoring the connection state of a user terminal according to claim 8, wherein after confirming said user terminal is in a disconnected state, the method further comprises imposing a forced off-line treatment on said user terminal and informing the user terminal of the forced off-line treatment.

13. The method for monitoring the connection state of a user terminal according to claim 8, wherein the sending, the receiving, the updating, the determining the time difference, the calculating, and the two assigning steps are all performed by a Portal Server.

14. The method for monitoring the connection state of a user terminal according to claim 8, wherein said browser page is an HTML file.

15. A method for monitoring the connection state of a user terminal, the method comprising:

from a Porter Server, sending a browser page to the user terminal when the user terminal accesses a network, wherein the browser page comprises a timer and a user connection state information;

sending a page updating request packet from the browser page to the Portal Server every time the browser page on the user terminal determines that the timer set therein has timed out;

after receiving the page updating request packet from the user terminal, updating an online time of the user terminal, wherein the updating is performed by the Portal Server;

determining a time difference between the online time of said user terminal and a current system time of the Portal Server;

calculating a time interval between two consecutive page updating request packets sent by said user terminal;

assigning said user to a disconnected state if said time difference is greater than the calculated time interval;

assigning said user to a connected state if said time difference is not greater than the calculated time interval; and sending the user connection state information from the Portal Server to the user terminal, wherein the user terminal can update the user connection state information based on the sent information.

* * * * *

UNITED STATES PATENT AND TRADEMARK OFFICE
CERTIFICATE OF CORRECTION

PATENT NO.       : 7,836,167 B2
APPLICATION NO.  : 11/337761
DATED            : November 16, 2010
INVENTOR(S)      : Zhu et al.

Page 1 of 1

It is certified that error appears in the above-identified patent and that said Letters Patent is hereby corrected as shown below:

In the Claims:

In Col. 6, line 55, claim 11, delete "disconnection" and insert --connection--.

Signed and Sealed this
Eleventh Day of January, 2011

David J. Kappos
*Director of the United States Patent and Trademark Office*